UNITED STATES PATENT OFFICE 2,415,041

UNSATURATED ETHER-CELLULOSE DERIVATIVE AND THE PROCESS OF MAKING SAME

John B. Rust, West Orange, N. J., assignor to Montclair Research Corporation, a corporation of New Jersey No Drawing. Application March 23, 1944, Serial No. 527,830

11 Claims. (Cl. 106—197)

The present invention relates to cellulose derivatives and to the process of making same. It is an object of this invention to provide derivatives of cellulose which are soluble in dilute alkalies.

It is a further object of this invention to make available cellulose derivatives which are useful as textile sizing compositions.

It is an object of this invention to provide wash- and laundering-fast cellulosic textile sizes.

It is a further object to provide cellulose derivatives which may be dissolved in alkali solution and spun into fibers in a suitable precipitating bath for the production of artificial silk or precipitated in the form of film or foils. It is also an object of this invention to provide paper sizing and modifying agents.

Other objects and advantages will become apparent from the more detailed description of the invention given hereinafter. Such detailed description should not be construed as limiting, but only by way of explanation and illustration, since numerous variations may be made by those skilled in the art without departing from the scope and spirit of the present invention.

The derivatives of the present invention may be formed by the reaction of an alkali cellulose derivative, as for instance, soda cellulose, potash cellulose, lithium cellulose, quaternary ammonium cellulose and the like with unsaturated ethers. The reaction may be effected in the cold, in some instances, and in others by the application of heat.

As instances of unsaturated ethers which may be used in the process of the present invention are divinyl ether, diallyl ether, dimethallyl ether, vinyl ethyl ether, vinyl propyl ether, vinyl amyl ether, vinyl phenyl ether, allyl ethyl ether, allyl butyl ether, and the like. I may first react cellulose with sodium hydroxide, for instance, to form soda cellulose. After aging the soda cellulose to a satisfactory degree, as explained below, it is mixed with cooling with the unsaturated ether. Reaction is effected either in the cold or the reaction mixture is allowed to warm up and further heating applied. Thus the unsaturated ethers of the present invention may be represented by:

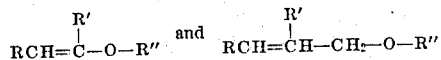

where R, R' and R" may be alkyl, aryl, alkaryl, aralkyl, olefinyl, alkynyl, and the like, or R and R' may be hydrogen. These unsaturated ethers belong to the general class represented by the formula:

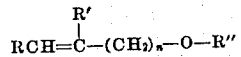

where $n$ is a whole number selected from 0 and 1, where R, R' and R" are monovalent organic radicals as noted above, and where R and R', besides being monovalent organic radicals, may also be hydrogen. Such compounds do not depend upon the presence of halogen in the molecule in order to get reaction with alkali cellulose.

In the reaction of the present invention, it is suggested that the following reaction may occur. Representing cellulose as Cell-OH:

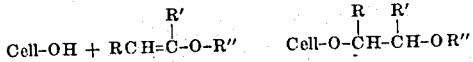

and

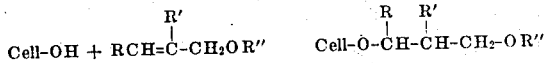

The above is given by way of possible explanation only and should not be construed as limiting, since I do not wish to be limited by any theoretical explanation of the reaction of the present invention.

The cellulose derivatives are soluble in alkalies, with cooling or not, according to the number and kind of substituted groups. Thus, I may make a derivative which is insoluble in alkali at ordinary temperatures but which is readily soluble by cooling the alkali suspension to about 0° C. Such solutions are valuable as textile sizing agents. The solutions, usually of about 1% to 10% strength, are applied to cotton, linen, or rayon goods on a padder, squeezed, dried and coagulated by using a solution of an acid, acid salt, or a precipitating concentrated salt solution. The treated textile is washed thoroughly after coagulating and then dried. A firm hand is imparted to the fabric which is resistant to laundering and the ordinary cleansing agents. The finish may be applied at practically any convenient stage of processing such as before kier boiling, before dyeing and the like.

Cellulose in its various forms may be used in the present invention. However, after forming the alkali or quaternary ammonium cellulose, I prefer to age it to secure some controlled degradation until the desired viscosity is obtained. The viscosity may be varied both by using different forms and sources of cellulose, by introducing more or less reactant and by degrading the cellulose to a greater or lesser degree.

In the reaction of the present invention, I may use inert diluents if desired such as ethylene dichloride, carbon tetrachloride, benzene, ethyl ether, heptane, and the like. When making the alkali cellulose, concentrations of from 15% to 50% of alkali may be used although greater or lesser concentrations can be employed. I usually prefer to employ concentrations of about 30% to 40%. This is also true of the quaternary ammonium hydroxides. When using these latter materials, solution of the cellulose sometimes occurs. In such cases, the solutions may be diluted with alkali metal hydroxide solutions before reaction. Such quaternary ammonium hydroxides may be trimethyl benzyl ammonium hydroxide, tetraethyl ammonium hydroxide, diethyl dipropyl ammonium hydroxide, diethyl piperidinium hydroxide, methyl pyridinium hydroxide, and the like.

The proportions of reactants may be varied within very large limits of, for example, from 5% to about 100% of the cellulose. For several reasons it may be desirable to use an excess of unsaturated ether. A greater proportion of unsaturated ether may be used to accelerate the reaction, which may then be terminated before completion, if desired.

As well as utilizing the unsaturated ethers given above, I may also use unsaturated ethers substituted with negative groups according to the general formulas:

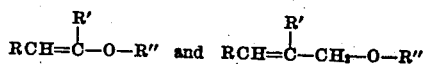

where R and R' may be, besides alkyl, aryl, etc., cyano, carboxy, carbalkoxy, aldehydo, acyl and the like.

Therefore, the process of the present invention consists in allowing cellulose to react with an excess of a 15% to 50% (preferably about 30% to 40%) aqueous solution of an alkali such as sodium hydroxide to form alkali cellulose. The amount of alkali amounts to from 3 to about 8 moles per $C_6H_{10}O_5$ group of cellulose. To this mixture is then added from 5% to about 100% (based on dry cellulose) of an unsaturated ether as above defined and reacted for a period of from 1 to about 5 hours. The reaction temperature is between ice temperature and boiling, higher temperatures being employed when a degraded product (that is, one producing a lower viscosity) is desired, but in any case it is desirable to start the reaction at low temperatures. Afterwards the reaction mixture is acidified, whereby the product is coagulated and can be filtered, washed and dried. The dried product is capable of dissolving in dilute aqueous alkalies to form a homogeneous solution useful particularly as a wash-fast size for fabrics.

The following examples are given to illustrate the products and processes of the present invention. All proportions are in parts by weight.

*Example 1.*—63 parts of soda cellulose containing 15 parts of cellulose and 48 parts of 33% aqueous sodium hydroxide were mixed with 7.5 parts of dimethallyl ether. The mixture was thoroughly homogenized and reacted for 3 hours at 70° C. At the end of this period water was added to the reaction product. The suspension was then acidified with glacial acetic acid and filtered. The cellulose derivative was washed with water and acetone and dried at room temperature. A white fibrous material was obtained in this way which was soluble in dilute aqueous sodium hydroxide.

*Example 2.*—68 parts of soda cellulose, which contained 15 parts of cellulose and 53 parts of 30% sodium hydroxide solution, were intimately mixed with 7.5 parts of diallyl ether. The mixture was then allowed to react for 3 hours at 70° C. during which period the material was stirred every half hour. At the end of the reaction period the product was acidified with acetic acid, filtered and washed. The white fluffy cellulose derivative thus formed was soluble in sodium hydroxide solutions on cooling.

*Example 3.*—A solution of the dimethallyl ether cellulose derivative described in Example 1 was made by mixing 5 parts of dimethallyl ether-cellulose with 30 parts of 33% aqueous sodium hydroxide, 40 parts of water and 30 parts of crushed ice. On stirring a smooth suspension was obtained which was relatively non-viscous at room temperature.

*Example 4.*—A solution was made of the diallyl ether cellulose of Example 2 as follows: 20 parts of diallyl ether cellulose derivative was mixed with 120 parts of 30% sodium hydroxide solution, 160 parts of water, and 120 parts of crushed ice. On stirring a clear smooth solution was formed. The solution was permitted to come to room temperature and was found to be of medium viscosity.

*Example 5.*—66.5 parts of soda cellulose containing 15 parts of cellulose, 15.5 parts of sodium hydroxide and 36 parts of water was mixed with 30 parts of snow and 7.5 parts of divinyl ether. The mixture was allowed to come to room temperature and thereafter it was kept in a water bath at 70° C. for 1 hour, stirring frequently during both periods. The mixture was then diluted with 150 parts of water and acidified with glacial acetic acid. After this the material was washed with water and acetone and dried at room temperature. A white fibrous product was obtained which is soluble in cold aqueous sodium hydroxide.

*Example 6.*—A solution was made by dissolving 10 parts of divinyl ether cellulose in 60 parts of 30% sodium hydroxide, 80 parts of water, and 60 parts of crushed ice. The components were thoroughly mixed. When the solution had attained room temperature, a very viscous, smooth dispersion had formed.

I claim:

1. A cellulose derivative soluble in dilute aqueous alkali solutions comprising the reaction product of alkali cellulose with an unsaturated ether of the formula:

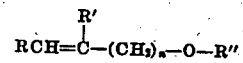

where $n$ is a whole number selected from 0 and 1, where R" is selected from the class consisting of alkyl, aryl, alkaryl, aralkyl, olefinyl, alkynyl, cyano, carboxy, carbalkoxy, aldehydo and acyl groups and where R and R' are selected from the class consisting of hydrogen and the groups corresponding to R".

2. A cellulose derivative soluble in dilute aqueous alkali solutions comprising the coagulated, washed and dried reaction product of soda cellulose with an unsaturated ether of the formula:

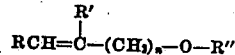

where $n$ is a whole number selected from 0 and 1, where R" is selected from the class consisting of alkyl, aryl, alkaryl, aralkyl, olefinyl, alkynyl, cyano, carboxy, carbalkoxy, aldehydo and acyl groups and where R and R' are selected from the class consisting of hydrogen and the groups corresponding to R''; the unsaturated ether being reacted in the proportions of 5% to about 100% of the cellulose and with the soda cellulose being prepared from a 30% to 40% solution of sodium hydroxide with from 3 to 8 moles of NaOH per $C_6H_{10}O_5$ group of cellulose.

3. A cellulose derivative soluble in dilute aqueous alkali solutions comprising the reaction product of dimethallyl ether and alkali cellulose.

4. A cellulose derivative soluble in dilute aqueous alkali solutions comprising the reaction product of diallyl ether and alkali cellulose.

5. A cellulose derivative soluble in dilute aqueous alkali solutions comprising the reaction product of divinyl ether and alkali cellulose.

6. A solution of the product of claim 1 in dilute aqueous alkali.

7. The process of making a cellulose derivative which is soluble in dilute aqueous alkali solutions which comprises reacting an alkali cellulose with an unsaturated ether of the formula:

$$RCH=\overset{R'}{\underset{|}{C}}-(CH_2)_n-O-R''$$

where $n$ is a whole number selected from 0 and 1, where R'' is selected from the class consisting of alkyl, aryl, alkaryl, aralkyl, olefinyl, alkynyl, cyano, carboxy, carbalkoxy, aldehydo and acyl groups and where R and R' are selected from the class consisting of hydrogen and the groups corresponding to R''.

8. The process of making a cellulose derivative which is soluble in dilute aqueous alkali solutions which comprises reacting at a temperature between ice temperature and boiling, a soda cellulose and an unsaturated ether of the formula $$RCH=\overset{R'}{\underset{|}{C}}-(CH_2)_n-O-R'$$

where $n$ is a whole number selected from 0 and 1, where R'' is selected from the class consisting of alkyl, aryl, alkaryl, aralkyl, olefinyl, alkynyl, cyano, carboxy, carbalkoxy, aldehydo and acyl groups and where R and R' are selected from the class consisting of hydrogen and the groups corresponding to R''; the amount of unsaturated ether being from 5 to about 100% of the cellulose and the soda cellulose being prepared from a 30% to 40% solution of sodium hydroxide with from 3 to 8 moles of NaOH per $C_6H_{10}O_5$ group of cellulose; and thereafter coagulating the reaction and recovering the same by filtering, washing and drying.

9. The process of making a cellulose derivative which is soluble in dilute aqueous alkali solution which comprises reacting dimethallyl ether with alkali cellulose.

10. The process of making a cellulose derivative which is soluble in dilute aqueous alkali solution which comprises reacting diallyl ether with alkali cellulose.

11. The process of making a cellulose derivative which is soluble in dilute aqueous alkali solution which comprises reacting divinyl ether with alkali cellulose.

JOHN B. RUST.